(12) United States Patent
Mueller (10) Patent No.: US 8,179,920 B2
(45) Date of Patent: May 15, 2012

(54) HIGH EFFICIENCY PREAMBLES FOR COMMUNICATIONS SYSTEMS OVER PSEUDO-STATIONARY COMMUNICATION CHANNELS

(75) Inventor: Arndt Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 238 days.

(21) Appl. No.: 12/557,288

(22) Filed: Sep. 10, 2009

(65) Prior Publication Data

US 2010/0061403 A1 Mar. 11, 2010

Related U.S. Application Data

(60) Provisional application No. 61/096,268, filed on Sep. 11, 2008, provisional application No. 61/096,435, filed on Sep. 12, 2008, provisional application No. 61/145,076, filed on Jan. 15, 2009.

(51) Int. Cl.
*H04J 3/24* (2006.01)
*H04J 3/00* (2006.01)
(52) U.S. Cl. ........................ 370/474; 370/464
(58) Field of Classification Search .................. 370/474
See application file for complete search history.

(56) References Cited

U.S. PATENT DOCUMENTS

| 2005/0054313 A1* | 3/2005 | Gummadi et al. ......... 455/226.1 |
| 2006/0018287 A1* | 1/2006 | Walton et al. ................ 370/334 |
| 2008/0212591 A1* | 9/2008 | Wu et al. ................. 370/395.21 |

\* cited by examiner

*Primary Examiner* — Derrick Ferris
*Assistant Examiner* — Maharishi Khirodhar
(74) *Attorney, Agent, or Firm* — Bruce W. Greenhaus; Duane Morris LLP

(57) ABSTRACT

A method includes appending a preamble to a data packet and transmitting the preamble and data packet over a communication channel in the network. The preamble may be a Beacon, Admission, Broadcast, or High-Throughput Preamble. The Beacon Preamble includes the following symbols SS, SS, SS, SS, SS, SS, SS, SS, SS, SS, SS, SS, $LS_1$, $LS_1$, $LS_1$, $LS_1$, $LS_1$, $LS_1$, $LS_1$, $LS_1$, $CP_0$, $CE_{Beacon}$, $CE_{Beacon}$. The Admission Preamble includes the following symbols SS, SS, SS, SS, SS, SS, SS, SS, SS, SS, SS, $LS_1$, $LS_1$, $LS_1$, $LS_1$, $LS_1$, $LS_1$, $LS_1$, $LS_1$, $CP_0$, CE, CE. The Broadcast Preamble includes the following symbols $LS_1$, $LS_1$, $LS_1$, $LS_1$, $CP_0$, CE, CE. The high-throughput preamble includes the following symbols $CP_0$, CE. The SS symbol includes 64 bits, the $LS_1$, $LS_2$, and $CP_0$ symbols include 192 bits, the CE symbol includes 512 bits, and the $CE_{Beacon}$ symbol is a subset of CE.

2 Claims, 3 Drawing Sheets

HIGH EFFICIENCY PREAMBLES FOR COMMUNICATIONS SYSTEMS OVER PSEUDO-STATIONARY COMMUNICATION CHANNELS

RELATED APPLICATIONS

The application claims the benefit of U.S. provisional application No. 61/096,268 filed Sep. 11, 2008, entitled "High efficiency preambles for communications systems over pseudo-stationary communication channels", and U.S. provisional application No. 61/096,435 filed Sep. 12, 2008, entitled "Parametric construction of PHY-frame preambles on coax", and U.S. provisional application No. 61/145,076 filed Jan. 15, 2009, entitled "High efficiency preambles for communications systems over pseudo-stationary communication channels.

FIELD OF DISCLOSURE

The disclosed system and method relate to the transmission of data through a network. More particularly, the disclosed system and method relate to transmitting data through an orthogonal frequency division multiplexed (OFDM) network with high-efficiency preambles.

BACKGROUND

In a conventional Multimedia Over Coaxial Alliance (MoCA) network, data packets are transmitted over a coaxial communication channel. Each data packet in a conventional MoCA network includes a preamble followed by a data payload. The preambles are used to calibrate the receiver to receive the following data with the appropriate gain, phase and frequency compensation. The preambles are also used by the receiver to determine when the first OFDM symbol of the payload will be received at the receiver.

Figure 1:
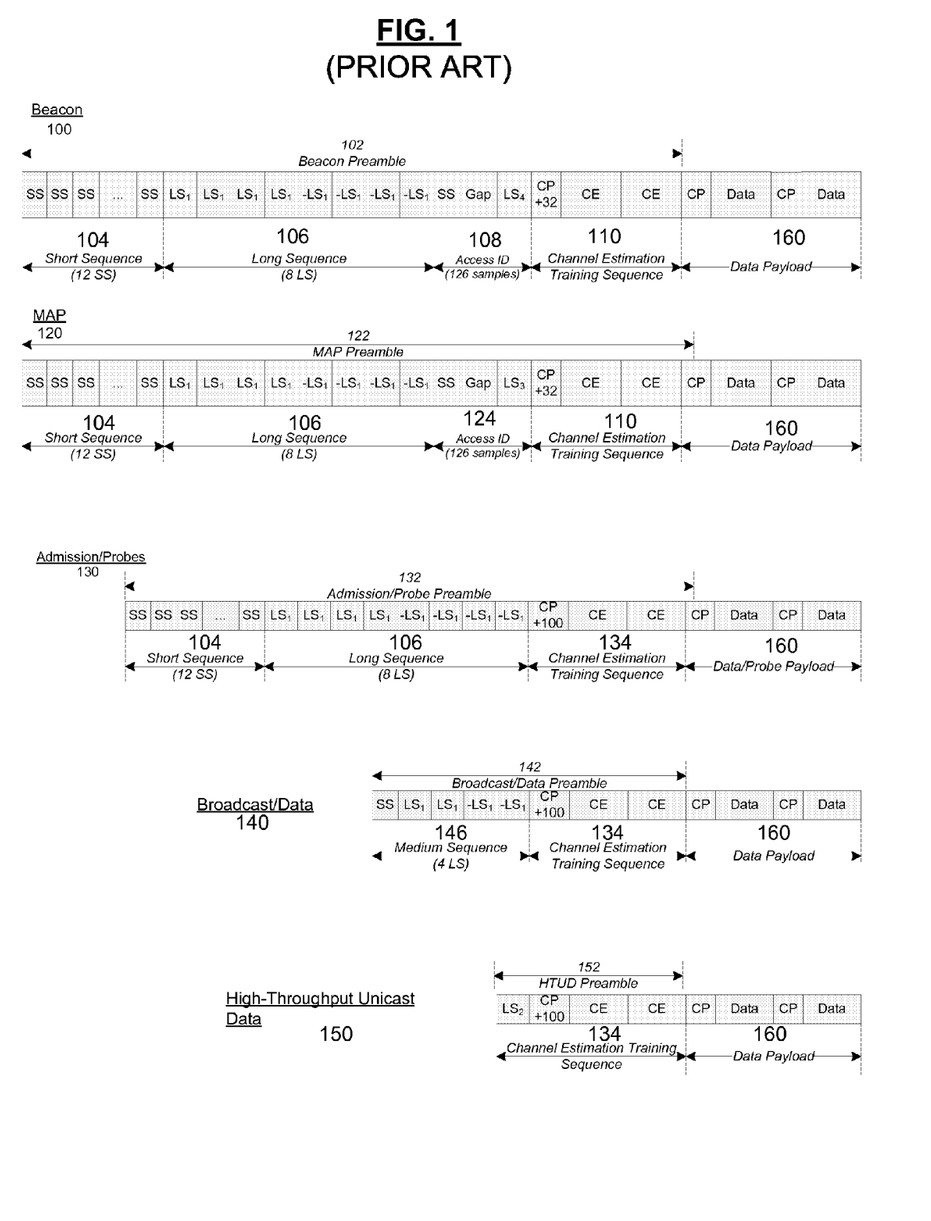
FIG. 1 illustrates conventional preambles used in a MoCA 1.0 network.

FIG. 1 illustrates five different preambles 102, 122, 132, 142, 152 of four different lengths that are utilized in a conventional MoCA 1.0 network. Each preamble is made up of some combination of Short Segments (SS), Long Segments (LS), Gaps, Cyclic Prefixes (CP), and Channel Estimation Symbols (CE).

Each SS segment is defined by a 30-bit binary data input sequence, such as {0111 0000 1000 0111 1100 0100 1111 10}. Each bit of the binary data input sequence is modulated using $\pi/4$—offset Bi-Phase Shift Key (BPSK) modulation.

Each LS segment is defined by one of two 64-bit binary data input sequences: LS1, having a binary sequence such as {1111 1101 0101 0110 0100 0100 1011 0110 0011 1010 0001 1010 1110 0111 1011 1110} and LS2, having a binary sequence such as {1011 1001 1110 1111 1000 0001 0101 0011 0010 0010 0101 1011 0001 1101 0000 1101}. As is the case with the SS, each bit of the binary data input sequence of the LS is modulated as a $\pi/4$—offset BPSK modulation. As noted in FIG. 1, half of the LS segments that are used in a Long Sequence 106 are inverted (as noted by the negative sign shown for LSs of the second half of the Long Sequence 106).

Each Gap consists of 32 in-phase and quadrature zeros at a nominal sample rate of 50 MHz.

Each CP is a repeat of the end of the symbol at the beginning. The purpose is to allow multipath to settle before the main data arrives at the receiver. The receiver is normally arranged to decode the signal after it has settled because this avoids inter-symbol interference. The length of the cyclic prefix is often equal to the duration of the channel impulse response.

Each CE is a 256-bit binary data sequence in which each bit is modulated on one of the 256 active sub-carriers. The bit sequence is, for example, the binary sequence expressed in hexidecimal notion as {ABD2 F451 90AE 61E1 D660 D737 3851 2273 6DE9 86E5 B401 CCC6 8DC1 2613 E116 0E2E} where the first bit in the sequence is assigned to the 0th sub-carrier and the last bit is assigned to the 255th sub-carrier.

The preamble lengths are varied to maximize the available bandwidth for data transmission. As shown in FIG. 1, the two most robust preambles are the Beacon Preamble 102 and the MAP Preamble 122. The Beacon Preamble 102 and the MAP Preamble 122 are the most robust and least efficient preambles because they are used for network coordination and contain information concerning the network. The second most robust preamble type is the Admission/Probes Preamble 132. The Admission/Probe Preamble 132 is used by a transmitter to accommodate a receiver that has little-to-no a priori information about the communication link over which the transmitter will transmit data. The second most efficient preamble is the Broadcast/Data Preamble 142. The Broadcast/Data Preamble 140 is used to transfer data from a transmitter to one or more receivers and assumes the receiving node has some a priori information about the communication link. The most efficient, and thus shortest, preamble is the High-Throughput Unicast Data (HTUD) Preamble 152. The HTUD Preamble 152 is appended to the beginning of a data packet when the receiver has a substantial amount of a priori information about the communication channel.

Beacon Preamble

In a conventional MoCA network, a Beacon 100 is transmitted at regular intervals by the network's Network Controller (NC). In some embodiments, the NC transmits a Beacon 100 every 10 ms. A node attempting to join an existing MoCA network may scan for a Beacon 100, which provides network information such as the channel time clock (CTC), the MoCA network version, and the time of the next admission control frame (ACF) in the data payload 160. Once a node has joined a MoCA network, the node uses the Beacons 100 to track the CTC, determine when the next MAP 120 occurs, and to track a NC handoff, e.g., when the NC changes from one node to another node.

As shown in FIG. 1, the Beacon Preamble 102 includes a Short Sequence 104 followed by a Long Sequence 106. An Access ID 108 follows the long sequence 106 and precedes a Channel Estimation Training Sequence 110. The data payload 160 follows the Channel Estimation Training Sequence 110.

The Short Sequence 104 comprises twelve SS segments, each of which is comprised of 30 time domain samples at a sample rate of 50 MHz. In accordance with one embodiment of the disclosed method and apparatus, the Short Sequence 104 is used by a receiving node for making automatic gain control (AGC) adjustments. There are two scenarios in which a Beacon 100 may be received at a receiving node. In one scenario, the receiving node is attempting to join the MoCA network. Accordingly, the node will have no information about the network and the Short Sequence 102 is used to accommodate the AGC adjustments that may be required by the joining node. In the second scenario, the node is already connected to the network and thus the node will likely need to make few if any AGC adjustments since the NC regularly transmits messages through the MoCA network.

Long Sequence 106 comprises eight LS1 segments, each of which are comprised of 64 time domain samples at a sample rate of 50 MHz. In one embodiment of the disclosed method and apparatus, the Long Sequence 106 is used by a receiving node for burst detection, frequency estimation, deriving packet start time, and making a final AGC adjustment as described in greater detail below.

Access ID 108 includes an SS segment, a Gap, and an LS4 segment. The Gap has a length of 32 samples at a sample rate of 50 MHz, and is generated by setting the voltage on the communication link to zero volts.

The Access ID 108 of the Beacon Preamble 102 is used by a node searching for a Beacon 100 when attempting to join a MoCA network. For example, after burst detection has been performed by a receiving node, the receiving node will validate the Access ID 108. The validation of the Access ID 108 is accomplished by correlating the LS4 segment against a stored reference of the LS4 segment. If the Access ID 108 is not validated by the receiving node (e.g., there is a poor correlation between the stored reference value and incoming LS4 segment), then the receiving node will assume that burst detection occurred either on the preamble of a non-Beacon packet or was falsely detected. The receiving node will then reset the burst detector and continue searching for the Beacon 100 rather than continuing to process the packet. If the Beacon 100 is detected, then the receiving node will know a priori when the next Beacon 100 will arrive and validation of the Access ID 108 is not required.

The Channel Estimation Training Sequence 110 includes a cyclic prefix CP having a length of 64 samples at a sample rate of 50 MHz, plus an additional 32 samples at a sample rate of 50 MHz. The cyclic prefix CP and 32 additional samples are followed by two channel estimation symbols, CE. The Channel Estimation Training Sequence 110 is used for estimating the characteristics of the communication link or channel between two nodes. The cyclic prefix CP and the 32 additional samples in conjunction with the 126 samples of the Access ID 108 ensure that the burst detection and packet start time computations (e.g., when the data packet 160 will be received) are complete prior to the arrival of the channel estimation symbols, CE. In accordance with one embodiment of the disclosed method and apparatus, the two CE symbols are used to start the frequency and timing tracking loops of the receiving node.

MAP Preamble

MAPs 120 are broadcast packets sent by the NC to all of the network nodes to provide scheduling information and are transmitted on a frequent basis. In some MoCA networks, the MAPs 120 are transmitted by the NC approximately every 1 ms on average. The MAPs 120 identify when each network node is scheduled to transmit data through the network. As shown in FIG. 1, the MAP Preamble 122 is identical to the Beacon Preamble 102 with the exception of an LS3 segment being used instead of an LS4 segment. Descriptions of the like components of the MAP Preamble 122 are omitted to avoid redundancy.

A network node distinguishes a MAP 120 from a Beacon 100 by the outcome of the correlation of the LS segment of the Access IDs 108, 124. Accordingly, the LS3 and LS4 segments correlate against one another poorly so that a receiving node may easily distinguish between a MAP 120 and a Beacon 100.

Admission/Probe Preamble

Admission packets 130 are transmitted prior to a link profile being established for a node being admitted to the network. Accordingly, an Admission packet 130 is transmitted when a network node has little to no information concerning the communication link between it and the admitting network node. In these scenarios, the first Admission packet 130 is transmitted in an admission request, which has a scheduled time slot as identified by the Beacon or MAP packet 120. The Probes 130 are transmitted by each of the network nodes and are used to characterize communication channels between the transmitting network node and each of the other nodes connected to the network. The Probes 130 are transmitted at regular intervals between each of the network nodes.

As shown in FIG. 1, the Admission/Probe Preamble 132 is similar to the Beacon and MAP Preambles 102, 122 with two exceptions. One difference between the Admission/Probe Preamble 132 and the Beacon and MAP Preambles 102, 122 is that the Admission/Probe Preamble 132 does not include an Access ID 108, 124. The second difference between the Admission/Probe Preamble 132 and the Beacon and MAP Preambles 102, 122 is that the cyclic prefix CP of the Channel Estimation Training Sequence 134 is followed by 100 additional 50 MHz samples as opposed to the 32 additional 50 MHz samples implemented in the Beacon and Admission/Probe Preambles 102, 122.

The processing and use of the Short Sequence 104 and Long Sequence 106 of the Admission/Probe Preamble 132 are utilized by a receiving node in the same manner in which they are used by a receiving node receiving a Beacon or MAP Preamble 102, 122. Similar descriptions are not repeated.

The 100 additional samples that follow the cyclic prefix CP in the Admission/Probe Preamble 132 are implemented to ensure that the burst detection and packet start time computation performed by a receiving node are completed prior to the arrival of the channel estimation symbols CE. The CE symbols are used to start the frequency and timing tracking loops of the receiving node.

Broadcast Data Preamble

The Broadcast/Data Preamble 142 is attached to the beginning of all data packets that are broadcast by a network node. The Broadcast/Data Preamble 142 is shorter in length than the Beacon, MAP, and Admission/Probe Preambles 102, 122, 132 because the receiving nodes will have some information concerning the communication channels through which they will receive the data.

As shown in FIG. 1, the Broadcast/Data Preamble 142 includes a Medium Sequence 144 followed by a Channel Estimation Training Sequence 134. Medium Sequence 144 includes a single SS segment used for AGC adjustment followed by four LS1 segments, which in accordance with one embodiment of the disclosed method and apparatus, are used to perform a final AGC adjustment, burst detection, frequency estimation, and to derive the start time of the data.

The Channel Estimation Training Sequence 134 includes the cyclic prefix CP and 100 additional 50 MHz samples followed by two CE symbols. The 100 samples that follow the CP ensure that burst detection and packet start time computations performed by receiving nodes is completed prior to the arrival of the channel estimation symbols, CE, which are used to start the frequency and timing tracking loops of the receiving node.

HTUD Preamble

The HTUD Preamble 152 is the most efficient Preamble and is reserved for unicast data transmission between nodes having considerable a priori information concerning the communication channel through which they communicate. As shown in FIG. 1, the HTUD Preamble 152 includes an LS2 segment followed by the Channel Estimation Training Sequence 134.

The LS2 segment of the HTUD Preamble 152 is used for burst detection and deriving the start time of the data. Frequency estimation and AGC adjustments are not performed as the receiving nodes rely on a priori gain and frequency estimates to maximize data throughput.

While preambles are necessary to calibrate the receiver and identify the start of the data, they take up valuable network bandwidth and reduce the throughput of the communication channel.

Accordingly, high-efficiency preambles for communication systems over pseudo-stationary communications systems are desirable.

SUMMARY

A method and apparatus is disclosed herein for transmitting a data packet through a network, including appending a preamble to the data packet and transmitting the preamble and data packet over a communication channel in the MoCA network. In accordance with one embodiment, the preamble is one or more of a Beacon, Admission, Broadcast/Unicast, MAP or High-Throughput Preamble. The Beacon Preamble includes the following symbols SS, SS, SS, SS, SS, SS, SS, SS, SS, SS, SS, SS, $LS_1$, $LS_1$, $LS_1$, $LS_1$, $LS_1$, $LS_1$, $LS_1$, $LS_1$, $CP_0$, $CE_{Beacon}$, $CE_{Beacon}$. The Admission Preamble includes the following symbols SS, SS, SS, SS, SS, SS, SS, SS, SS, SS, SS, SS, $LS_1$, $LS_1$, $LS_1$, $LS_1$, $LS_1$, $LS_1$, $LS_1$, $LS_1$, $CP_0$, CE, CE. The MAP Preamble includes the following symbols SS, SS, SS, SS, SS, SS, SS, SS, SS, SS, SS, SS, $LS_2$, $LS_2$, $LS_2$, $LS_2$, $LS_2$, $LS_2$, $LS_2$, $LS_2$, $CP_0$, CE, CE. The Broadcast Preamble includes the following symbols $LS_1$, $LS_1$, $LS_1$, $LS_1$, $CP_0$, CE, CE. The Unicast Preamble includes the following symbols $CP_0$, CE, CE. The MAP Preamble includes the following symbols $LS_2$, $LS_2$, $LS_2$, $LS_2$, $CP_0$, CE, CE. The High-Throughput Preamble includes the following symbols $CP_0$, CE. The SS symbol is defined by 64 bits, the $LS_1$, $LS_2$, and $CP_0$ symbols are each defined by 192 bits, the CE symbol is defined by 512 bits.

DETAILED DESCRIPTION

High-Efficiency Preambles

The MoCA 1.0 preambles illustrated in FIG. 1 and described above have been the industry standard for several years. However, these preambles include inefficiencies that restrict the maximum obtainable throughput of a MoCA network.

The high-efficiency preambles described in detail below perform similar functions to those of the MoCA 1.0 preambles, but enable a higher throughput, more accurate power estimation and more accurate burst detection times, compared to the preambles of MoCA 1.0. Additionally, the data throughput of a MoCA network can be further increased by using ranging. For example, ranging enables a receiving node to predict when a packet will arrive by determining the distance between itself and the transmitting node. Accordingly, ranging enables a receiving node to narrow the window in which it looks to receive an incoming data packet as the receiving node will be able to determine when the packet should arrive.

Beacon Preamble

Figure 2:
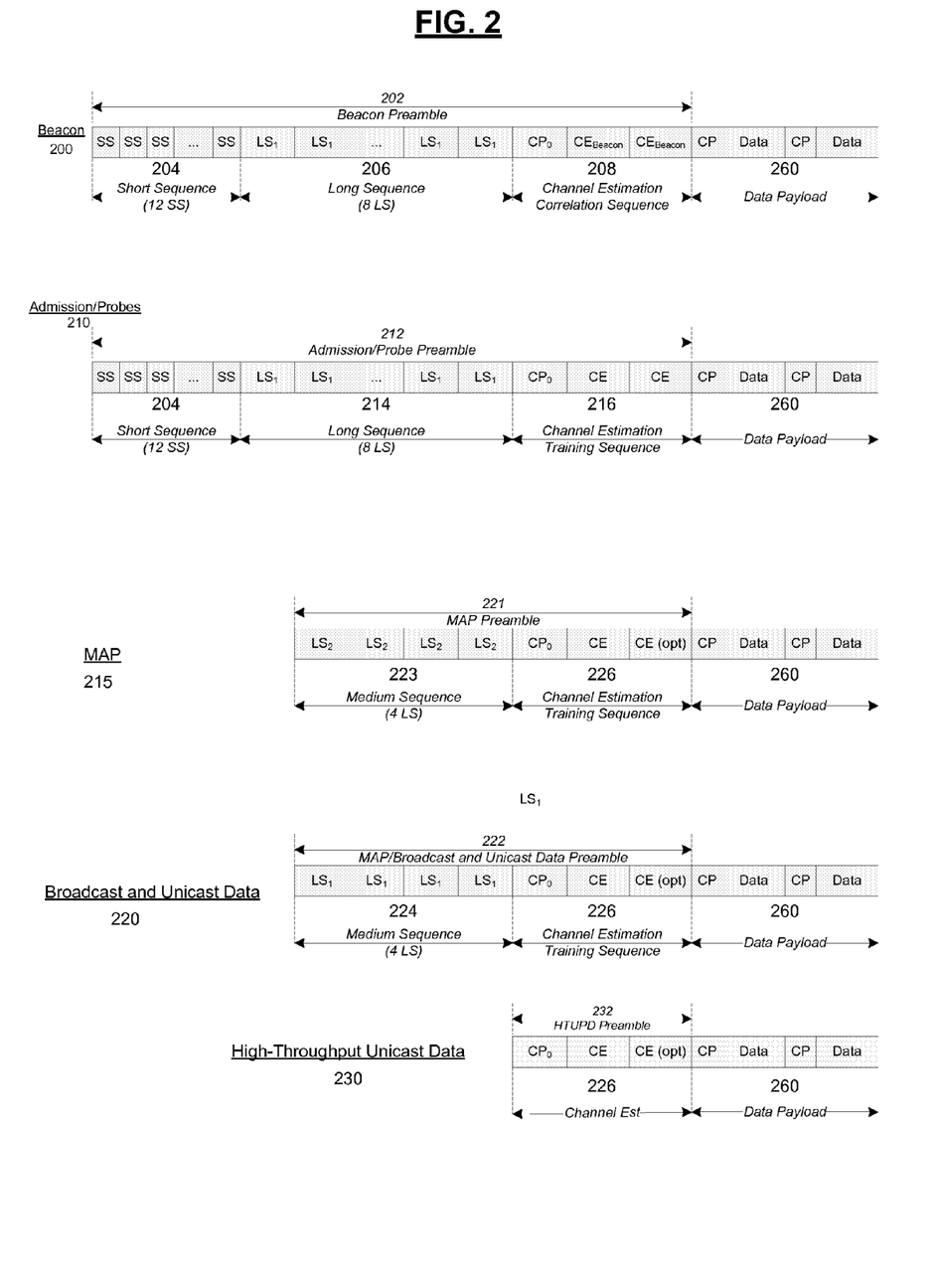
FIG. 2 illustrates one embodiment of high-efficiency preambles in accordance with the present disclosure.

FIG. 2 illustrates one embodiment of high-efficiency preambles 202, 212, 222, 232 in accordance with the present disclosure. In accordance with one embodiment, as shown in FIG. 2, a Beacon Preamble 202 may include a Short Sequence 204 followed by a Long Sequence 206. In one such embodiment, a Channel Estimation Correlation Sequence 208 and a data payload 260 follow the Long Sequence 206. In one embodiment, such a Beacon Preamble 202 is used when all of the nodes in the network will be capable of detecting this Beacon Preamble 202. That is, this Beacon Preamble 202 is best used in networks in which legacy devices that can only detect MoCA 1.0 Beacons 100 (shown in FIG. 1) are not permitted to join as nodes to the network. Alternatively, in some embodiments of the disclosed method and apparatus, the Beacon 100 is used in place of the more efficient Beacon 200 to allow legacy nodes to join the network.

Figure 3:
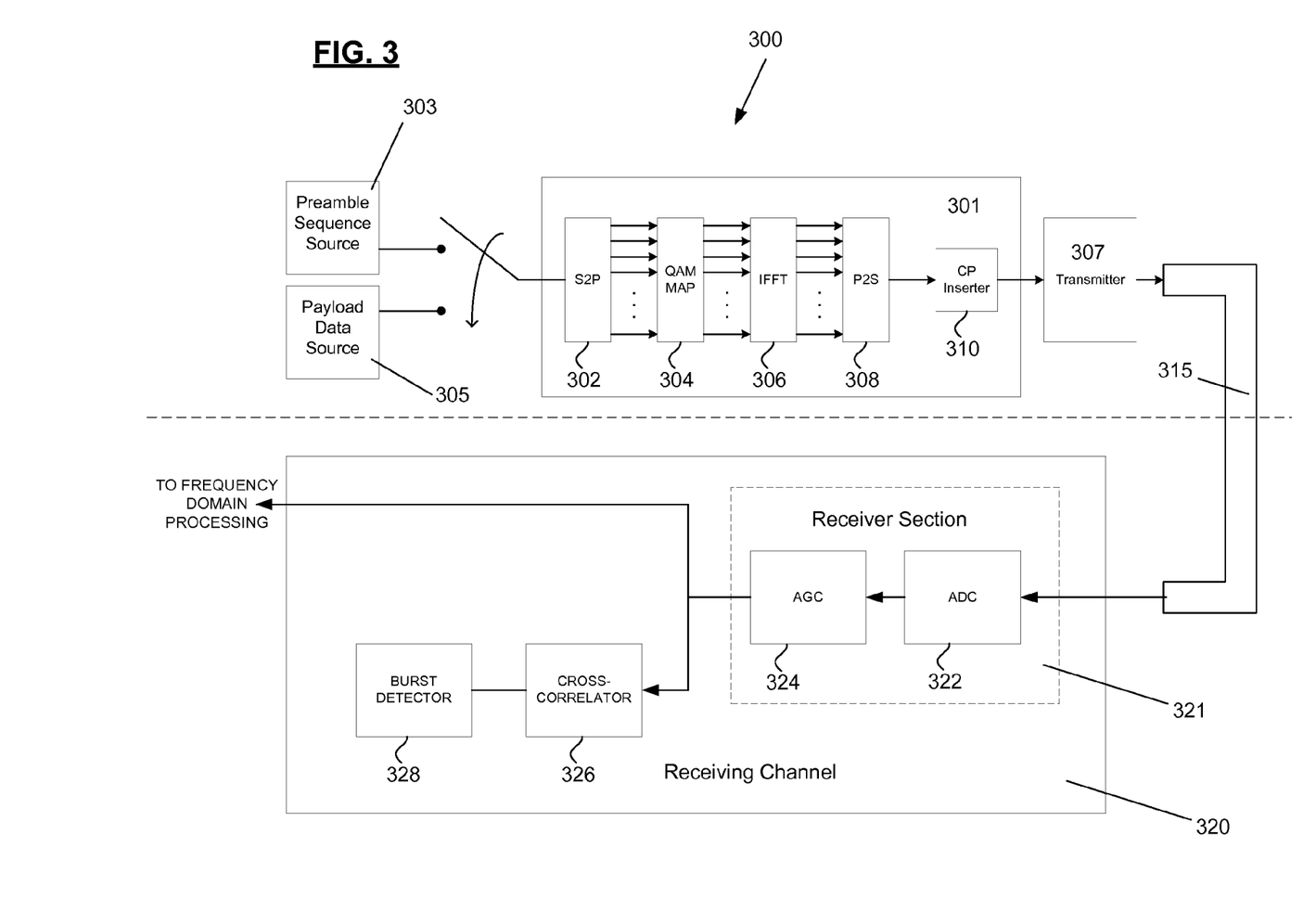
FIG. 3 illustrates a simplified architecture of a transmission channel and a receiving channel of a MoCA 2.0 node in accordance with the present disclosure.

In some embodiments, the Short Sequence 204 includes twelve "SS" Orthogonal Frequency Division Multiplexed (OFDM) symbols, each defined by 64 frequency domain bits. That is, each SS symbol is generated by using a 64-bit data sequence that is Bi-Phase Shift Key (BPSK) modulated onto 64 sub-carriers spaced over 100 MHz. In one particular embodiment, the spacing is even. Alternatively, the spacing can be selected to achieve a particular purpose. Each BPSK modulated sub-carrier is translated to the time-domain using a 64-point Inverse Fast Fourier Transform (IFFT). The samples from each of the 64 sub-carriers are summed in a parallel to serial converter to obtain one complex sample. Sixty-four such samples comprise an SS symbol. The time domain samples are generated at a 100 MHz sample rate. Accordingly, each sample represents the complex summation of all 64 sub-carriers over a discrete period of time equal to $1/(100^6)$ sec. The Short Sequence 204 consists of 12 such SS symbols. In accordance with one embodiment, each SS symbol is generated using the following short sequence (starting at sub-carrier 0 through sub-carrier 511 in steps of 8):

SS=[x001 0000 1111 1010 1101 0001 0011 101x
xx00 0101 1110 0010 1101 1010 0001 0000];

where a '0' represents the BPSK point $\{+1, 0\}$, a '1' represents the BPSK point $\{-1, 0\}$, and an 'x' represents $\{0, 0\}$. Additional details regarding the generation of the preambles are presented below with regard to FIG. 3.

The Long Sequence 206 includes eight "$LS_1$" symbols, each of which, in accordance with one embodiment of the disclosed method and apparatus, are defined by 128 frequency domain bits.

In accordance with one embodiment, $LS_1$ is generated using the following long sequence (starting at sub-carrier 0 through sub-carrier 511 in steps of 4):

$LS_1$=[x010 1011 1001 0010 1010 1011 1000 1001
0011 1001 0111 1100 1100 1001 0110 1xxx
xxxx 1111 0000 0110 1000 0001 1111 1100
1101 0101 1110 1111 1010 0011 0001 0000], where a '0' represents the BPSK point $\{+1, 0\}$, a '1' represents the BPSK point $\{-1, 0\}$, and an 'x' represents $\{0, 0\}$. Accordingly, sub-carrier 0 (the first sub-carrier) is modulated with x, sub-carrier 3 is modulated with a zero, sub-carrier 7 is modulated with a one, sub-carrier 10 is modulated with a zero, etc.

In one embodiment, the content of the Long Sequence 206 can be unique to the Beacon Preamble, and so a receiver can use the content of the Long Sequence 206 to identify the Beacon Preamble as such.

A Channel Estimation Correlation Sequence 208 includes a cyclic prefix "$CP_0$" followed by two Beacon Channel Estimation Sequences, "$CE_{Beacon}$". Each $CE_{Beacon}$ is defined by 512 frequency domain bits. In some embodiments, the cyclic prefix $CP_0$ has a length of 128 frequency domain bits. In an alternative embodiment of the disclosed method and apparatus, the length is 192 frequency domain bits. It will be understood by those skilled in the art that other lengths are possible as well.

A receiving node uses the Channel Estimation Correlation Sequence 208 to measure the channel response (the response of the communication channel between nodes), such that the channel's effects can be compensated for when decoding the data symbols. In addition, the channel estimation symbols are used to make long-term AGC energy measurements and to estimate the frequency offset (if two CE symbols are transmitted). It should be noted that one difference between the Channel Estimation Correlation Sequence and the MoCA 1.0 Channel Estimation Training Sequence 110 shown in FIG. 1 is that in the presently disclosed method and apparatus, the symbols of the Channel Estimation Correlation Sequence 208 are transmitted on all available sub-carriers. That is, in accordance with one embodiment of the presently disclosed method and apparatus, the Channel Estimation Correlation Sequence is transmitted on sub-carriers 4 thru 243 and 263 thru 508 (480 total sub-carriers). In contrast, MoCA 1.x mandated that the channel estimation symbols be transmitted on used sub-carriers only. Transmitting on all available sub-carriers (a) improves the performance of channel smoothing, (b) results in a constant and thus predictable channel estimation symbol, which is important for burst detection performance and (c) eliminates degenerate cases where the elimination of particular sub-carriers causes the Peak-to-Average Ratio (PAR) to exceed the transmitter clipping ratio. The PAR is measured as the magnitude $(I^2+Q^2)$.

The Short Sequence 204 of the Beacon Preamble 202 may be used by a receiving node for AGC adjustments. Long Sequence 206 of Beacon Preamble 202 may be used by a receiving node to perform minor AGC adjustments, burst detection, frequency estimation, and deriving the start time of the data payload 260.

As shown in FIG. 2, the improved Beacon Preamble 202 does not include an Access ID 108 (seen in FIG. 1). In some embodiments of MoCA, the Access ID 108 was intended to be used by a receiver to distinguish a Beacon packet from a MAP packet. When looking for an asynchronous Beacon (i.e. when the arrival time of the Beacon is unknown), the Access ID was used to distinguish the Beacon from MAP packets and Admission/Probe packets. Note that for packets being transmitted in a MoCA network, all packets other than the Beacon are synchronous. Accordingly, the receiver knows a priori what packet type is going to be received and thus ignores the Access ID. In accordance with one embodiment of the presently disclosed method and apparatus, the $CE_{Beacon}$, or some subset thereof, is used as a Channel Estimation Correlation Sequence 208 to distinguish the packets of a Beacon 200 from other packets, thus allowing the elimination of the Access ID 108 from the presently disclosed method and apparatus. Eliminating the Access ID 108 from the Beacon Preamble 202 provides improved data throughput through the communication channel.

Additionally, eliminating the Access ID 108 and implementing a 192 sample $CP_0$ enables a receiving node to better estimate the energy of the incoming packet. As described above, the Access ID 108 of the MoCA 1.0 Beacon Preamble 102 begins with a 32 sample SS symbol followed by a zero volt Gap. Due to signal processing delays, a receiving node may frequently underestimate the power of the incoming packet as the energy measurements performed during the AGC adjustments would include a portion of the Gap, resulting in a power underestimation of approximately 1 dB, depending upon the implementation.

The improved Beacon Preamble 202 of the presently disclosed method and apparatus enables more accurate power estimation by eliminating the Access ID 108 and providing a cyclic prefix $CP_0$, which may have one or more non-zero values. Accordingly, if a receiving node experiences signal processing delays, the non-zero volt values of the cyclic prefix $CP_0$ eliminate the power underestimation by the receiving node.

In one embodiment of the disclosed method and apparatus, a Channel Estimation Correlation Sequence 208 may be used by a receiving node to distinguish a Beacon from other packets, e.g., validate that the packet is in fact a Beacon 200. Receiving nodes may determine that a preamble is a Beacon Preamble 202 because the Beacon Preamble 202 is the only preamble that includes a Beacon Channel Estimation ($CE_{Beacon}$) symbol. For example, a receiving node may correlate the received $CE_{Beacon}$ symbol against the symbol it expects to receive in a Beacon Preamble. The results of the correlation of the $CE_{Beacon}$ and the reference symbol will identify whether the received preamble was a Beacon Preamble, as described in greater detail below. In one embodiment, the receiver looks for whether a CE symbol is received. If a CE symbol was not received, the receiving node determines that the preamble is a Beacon Preamble 202 as it is the only preamble that does not include the CE symbol, but rather includes a $CE_{Beacon}$ symbol.

In another embodiment of the disclosed method and apparatus, in addition to, or instead of, using a unique channel estimation symbol, a different set of LS symbols (i.e. $LS_1$ vs. $LS_2$) can be used for Beacons.

Admission/Probe Preamble

As shown in FIG. 2, an Admission/Probe Preamble 212 may include the Short Sequence 202 including a plurality of SS symbols followed by the Long Sequence 214 including a plurality of $LS_1$ symbols. The Long Sequence 214 may be followed by a Channel Estimation and Training Sequence 216 that may include the cyclic prefix $CP_0$ and two channel estimation symbols, CE.

One embodiment of the disclosed method and apparatus uses the following CE symbol (starting at sub-carrier 0 through sub-carrier 511):

CE=[xxxx 1011 1101 0010 1111 0100 0101 0001
        1001 0000 1010 1110 0110 0001 1110 0001
        1101 0110 0110 0000 1101 0111 0011 0111
        0011 1000 0101 0001 0010 0010 0111 0011
        1111 0011 0000 1110 1011 1100 0001 0010
        0010 0101 1010 1110 1001 1100 1000 1110
        0000 0011 1010 1000 0111 1011 0101 1110
        1110 0011 1100 0100 1011 xxxx xxxx xxxx
        xxxx xxxx xxxx x001 0010 1011 0100 1000
        1001 0010 0000 0011 1111 1001 0100 0111
        0010 1100 0010 1001 1101 1100 1100 0111
        0110 0000 1100 0111 0010 0110 0110 1100
        0110 1101 1110 1001 1000 0110 1110 0101
        1011 0100 0000 0001 1100 1100 1100 0110
        1000 1101 1100 0001 0010 0110 0001 0011
        1110 0001 0001 0110 0000 1110 0010 1xxx]

where a '0' represents the BPSK point $\{+1, 0\}$, a '1' represents the BPSK point $\{-1, 0\}$, and an 'x' represents $\{0, 0\}$. Using the hexadecimal notation of MoCA 1.x, this can be written as:

CE=[ABD2 F451 90AE 61E1 D660 D737 3851 2273
        F30E BC12 25AE 9C8E 03A8 7B5E E3C4 Bxxx
        xxx1 2B48 9203 F947 2C29 DCC7 60C7 266C
        6DE9 86E5 B401 CCC6 8DC1 2613 E116
        0E2E]

The first and last 128 sub-carriers have the same CE symbol as defined by the industry standard MoCA 1.x (i.e., MoCA 1.0, 1.1, . . . etc.); only the center 256 sub-carriers are newly defined. This reduces the memory requirements and control logic for generating the CE symbol.

The channel estimation symbols shall modulate all of the available sub-carriers and not just those sub-carriers which are used by a particular packet. For example, if a particular sub-carrier is bitloaded to zero due to low signal-to-noise ratio or other considerations, the channel estimation symbol shall still transmit that sub-carrier.

In some embodiments, the $LS_2$ symbol may be used instead of $LS_1$ symbol. In embodiments in which a Beacon 200 is used, the $CE_{Beacon}$ symbol may be used by a receiving node to distinguish between a Beacon 200 and an Admission/Probe 210.

MAP Preamble

In a MoCA network, MAP packets 120 are transmitted as broadcast messages to each node connected to the network. Accordingly, in one embodiment, the improved high-efficiency preambles include a single preamble that is used for both the MAP packets and broadcast packets. However, as shown in FIG. 2, a MAP Preamble 215 may include a Medium Sequence 223 including a plurality of the $LS_2$ symbols. The $LS_2$ symbols are unique to the MAP Preamble and allow the receiver to distinguish the MAP packets from all other types of packets.

In accordance with one embodiment of the disclosed method and apparatus, use the following long sequence (starting at sub-carrier 0 through sub-carrier 511 in steps of 4):

LS2=[x101 1100 0001 1010 0100 1011 1011 1001
0011 0101 1101 0000 1000 0101 0011 0xxx
xxxx 1111 0010 1000 0111 0011 0011 0111
0101 0110 1001 1111 0011 1011 1000 1000]

where a '0' represents the BPSK point $\{+1, 0\}$, a '1' represents the BPSK point $\{-1, 0\}$, and an 'x' represents $\{0, 0\}$.

The Medium Sequence 223 is followed by a Channel Estimation Training Sequence 226. The Channel Estimation Training Sequence 226 may include a cyclic prefix $CP_0$ and the channel estimation symbol CE. In some embodiments, a second CE symbol may follow the first CE symbol.

In accordance with the presently disclosed method and apparatus, the MAP packet is sent relatively frequently. Thus, in accordance with the presently disclosed method and apparatus, the receiver gains a high confidence in the channel characteristics from these frequently received MAP packets. By relying upon the information gathered from previously sent packets, the short sequence of the MAP packets of the presently disclosed method and apparatus are not required to be used for AGC or frequency estimation given that the gain and frequency offsets can be easily be inferred from previous transmissions and tracked on the many MAP packets being generated and received. Therefore, the MAP Preamble of the presently disclosed method and apparatus does not have SS symbols. Furthermore, the number of LS symbols is reduced in the MAP Preamble 215 shown in FIG. 2 to four from the eight that are provided in the MAP Preamble 120 shown in FIG. 1.

Accordingly, the improved MAP Preamble 215 is significantly shorter than the MAP Preamble 122 shown in FIG. 1, thereby reducing the amount of data transmitted through a network. The savings in bandwidth is significant, as MAPs 120, 220 are frequently transmitted by the NC to other nodes. Additionally, the frequency with which a MAP 120, 220 is transmitted by an NC enables the MAP Preamble 222 to be shortened because the receiving node will likely not need to make AGC adjustments as it will have a priori information concerning the characteristics of the transmission channel between itself and the transmitting node.

Broadcast and Unicast Preamble

The Broadcast and Unicast Preamble 220 shown in FIG. 2 has essentially the same format as the MAP Preamble 215 with the exception of using $LS_1$ symbols rather than $LS_2$ symbols in the Medium Sequence 224.

HTUD Preamble

As shown in FIG. 2, the HTUD Preamble 232 may include a Channel Estimation Training Sequence 226 comprising the cyclic prefix $CP_0$ followed by the channel estimation symbol CE. The HTUD Preamble 232 may include the cyclic prefix $CP_0$ followed by the channel estimation symbol CE. In some embodiments, a second channel estimation symbol CE may follow the first CE symbol.

The improved HTUD Preamble 232 eliminates the need for an $LS_2$ symbol preceding the Channel Estimation Training Sequence 134 in the HTUD Preamble 152 shown in FIG. 1. HTUD packets 150, 230 are the most common packets transmitted in a MoCA network. Thus, the reduced length of the HTUD Preamble 232 increases the amount of data transmitted in the network and increases throughput. It should be noted that the $LS_2$ symbol can be eliminated because, in accordance with one embodiment of the presently disclosed method and apparatus, burst detection is performed by a receiving node correlating a known symbol with a portion of the channel estimation symbol, CE (or, alternatively, the entire symbol). This may require some buffering of the channel estimation symbol in the receiver, however, given that these packets are the predominant packet type, the improved throughput benefit will typically outweigh the costs of buffering.

Transmission and Receiver Processing Channel

FIG. 3 illustrates one example of a node 300 of a MoCA communication network coupled through the communication link 315 to a second node 320 in the MoCA communication network. In accordance with one embodiment of the disclosed method and apparatus, the node 300 includes a preamble generator 301 that receives a serial bit stream of frequency domain data bits. The serial bit stream is coupled to the preamble generator from either a preamble sequence source 303 or a payload data source 305. The node 300 includes a serial-to-parallel (S2P) block 302, a QAM map 304, an Inverse Fast Fourier transform (IFFT) block 306, parallel-to-serial (P2S) block 308, and a CP inserter block 310. The S2P 302 receives and assigns each of the frequency domain data bits to one of a plurality of sub-carriers of a carrier signal, as illustrated in FIG. 3, by the plurality of outputs emanating from the S2P block 302.

In some embodiments, the serial stream of bits provided by the preamble sequence source 303 provides a bit stream that defines portions of each of the preambles 202, 212, 222, 232 shown in FIG. 2. Those portions of the bit stream include a 512-bit channel estimation sequence that defines the CE symbols, a 128-bit LS sequence that defines the LS symbols and a 64-bit SS sequence that defines the SS symbols. The serial bit stream is modulated by the QAM map 304 using BPSK. Each bit of the 512-bit channel estimation sequence is assigned to a unique one of the sub-carriers; each bit of a 128-bit LS sequence is assigned to every fourth sub-carrier (the remaining sub-carriers are not modulated); and each bit of a 64-bit SS sequence is assigned to every eighth sub-carrier (the remaining sub-carriers are not modulated). One skilled in the art will understand that other modulation techniques including, but not limited to, 16-bit quadrature amplitude modulation (16-QAM), 32-QAM, 64-QAM, 128-QAM, 256-QAM or the like, may be used.

The QAM MAP block 304 is configured to modulate each bit on each sub-carrier. For example, if a preamble is modulated using BPSK, then a '0' may be modulated onto 1, +j, a '1' may be modulated onto −1, −j and an "unmodulated" sub-carrier may be "modulated" to 0, 0j. The bits of the data payload 260 are modulated using the appropriate QAM constellation as understood by one skilled in the art. This is done by modulating every $N^{th}$ sub-carrier (i.e., N=1, 4, 8) with one bit of the frequency domain bit stream. The IFFT block 306 converts the frequency-domain OFDM symbol output by the QAM map 304 into a stream of parallel time-domain symbols comprised of a parallel set of time domain samples at a sample rate of 100 MHz. The parallel time-domain symbols output by the IFFT block 306 are N repetitions of a 1/N-length sequence. For example, if the SS sequence includes 64-bits and every eighth sub-carrier is modulated, then a 512-sample output of the IFFT block 306 consists of eight identical repetitions of a 64-sample sequence. Likewise, every fourth sub-carrier is modulated for a 128-bit LS sequence resulting in the output of the IFFT block 306 being four identical repetitions of a 128-sample sequence.

The parallel-to-serial (P2S) block 308 converts the output of the IFFT block 306 into a sample stream for transmission over the communication link 315. The CP inserter block 310 may repeat portions of the OFDM symbols in order to provide guard time between symbols to protect against inter-symbol interference (ISI). For example, the CP inserter block 310 repeats preamble sequences, such as the 512-sample cyclic prefix CP.

The receiving channel 320 includes a receiver section 321. The receiver section 321 typically will include an analog-to-digital converter (ADC) 322 configured to receive the analog signal from the communication channel 315 and convert it to a digital signal. It will be understood by those skilled in the art that the receiver section 321 will typically also include frequency conversion and filtering (not shown in FIG. 3). However, in alternative embodiments, the receiver section may include only some of these components as necessary to receive and initially process the incoming received signals. The digital signal is received at an automatic gain controller (AGC) 324, which measures the energy of the received preamble 202, 212, 222, 232 and adjusts the gain of the receiver section (and more particularly in one embodiment, the ADC 324) such that the dynamic range of the data packet 260 fits within the dynamic range of the ADC 322 so that the data may be properly processed.

In one embodiment of the disclosed method and apparatus, a cross-correlator 326 compares a stored 2-bit quantized reference of each sample of the CE symbol with the output of the ADC 322. In some such embodiments, the quantized reference may be a −1, 0, or a +1 as −2 is not used. The cross-correlator 326 performs a cross-correlation by multiplying each 2-bit value of the stored quantized reference by the corresponding sample of the received quantized symbol. Once each complex sample of the received signal has been multiplied by its corresponding 2-bit complex value in the quantized reference, the magnitude of the complex result is obtained. If the magnitude is a large number, then there is a good cross-correlation. However, if the magnitude is a small number, then there is a poor cross-correlation. In accordance with one embodiment, the cross-correlator 326 is used to detect whether a $CE_{Beacon}$ has been received.

The burst detector 328 of receiver processing channel 320 may perform burst detection to detect the presence of the CE symbol in the receiving channel 320. For example, burst detection may be performed by observing a succession of linearly increasing peaks output from the cross-correlator 326.

The high-efficiency preambles described above enable higher data throughputs to be achieved in MoCA networks. In some embodiments, throughput increases of approximately 5-26 megabits per second (Mbps) may be realized, which is a substantial increase due to the bandwidth limitations of coaxial networks (i.e., networks in which nodes are connected to one another over coaxial cabling).

In addition to the above described embodiments, the disclosed method and system may be embodied in the form of computer-implemented processes and apparatus for practicing those processes. The present disclosed method and apparatus may also be embodied in the form of computer program code embodied in tangible media, such as floppy diskettes, read only memories (ROMs), CD-ROMs, hard drives, "ZIP™" high density disk drives, DVD-ROMs, blu-ray drives, flash memory drives, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes an apparatus for practicing the disclosed method and apparatus. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of transmitting an admission data packet through a coaxial network, comprising:
    a) generating an Admission Preamble including the following symbols SS, SS, SS, SS, SS, SS, SS, SS, SS, SS, SS, SS, $LS_1$, $LS_1$, $LS_1$, $LS_1$, $LS_1$, $LS_1$, $LS_1$, $LS_1$, $CP_0$, CE, CE;
    b) appending the Admission Preamble to a data payload; and
    c) transmitting the admission data payload and appended Admission Preamble over coaxial cable in a MoCA network;
    wherein:
        i) the SS symbol is defined by a 30-bit binary data input sequence,
        ii) the $LS_1$ symbol is defined by a 64-bit binary data input sequence,
        iii) $CP_0$ is a repeat of the end of the symbol,
        iv) CE is a 256-bit binary data sequence in which each bit is modulated on one of a plurality of active sub-carriers,
        v) generating comprises using the following short sequence: SS=[x001 0000 1111 1010 1101 0001 0011 101x xx00 0101 1110 0010 1101 1010 0001 00001; and
    wherein:
        vi) generating comprises using the following CE symbol: CE=[xxxx 1011 1101 0010 1111 0100 0101 0001 1001 0000 1010 1110 0110 0001 1110 0001 1101 0110 0110 0000 1101 0111 0011 0111 0011 1000

0101 0001 0010 0010 0111 0011 1111 0011 0000 1110 1011 1100 0001 0010 0010 0101 1010 1110 1001 1100 1000 1110 0000 0011 1010 1000 0111 1011 0101 1110 1110 0011 1100 0100 1011 xxxx xxxx xxxx xxxx xxxx xxxx x001 0010 1011 0100 1000 1001 0010 0000 0011 1111 1001 0100 0111 0010 1100 0010 1001 1101 1100 1100 0111 0110 0000 1100 0111 0010 0110 0110 1100 0110 1101 1110 1001 1000 0110 1110 0101 1011 0100 0000 0001 1100 1100 1100 0110 1000 1101 1100 0001 0010 0110 0001 0011 1110 0001 0001 0110 0000 1110 0010 1xxx] to generate each CE symbol; and vii) a '0' represents the BPSK point {+1, 0}, a '1' represents the BPSK point {−1, 0}, and an 'x' represents BPSK point {0, 0}.

2. A method of transmitting broadcast and unicast data packets through a coaxial network, comprising:

a) generating a Broadcast and Unicast Data Preamble including the following symbols $LS_1$,$LS_1$, $LS_1$, $LS_1$, $CP_0$, CE;

b) appending the Broadcast and Unicast Data Preamble to a data payload; and c) transmitting the data payload and appended Broadcast and Unicast Data Preamble over a communication channel in a MoCA network;

wherein:

i) the $LS_1$ symbol is defined by a 64-bit binary data input sequence, ii) $CP_0$ is a repeat of the end of the symbol, iii) CE is a 256-bit binary data sequence in which each bit is modulated on one of a plurality of active subcarriers;

iv) generating comprises using the following long sequence: $LS_1$=[x010 1011 1001 0010 1010 1011 1000 1001 0011 1001 0111 1100 1100 1001 0110 1 xxx xxxx 1111 0000 0110 1000 0001 1111 1100 1101 0101 1110 1111 1010 0011 0001 00001 to generate each $LS_1$ symbol; and v) generating comprises using the following CE symbol: CE=[xxxx 1011 1101 0010 1111 0100 0101 0001 1001 0000 1010 1110 0110 0001 1110 0001 1101 0110 0110 0000 1101 0111 0011 0111 0011 1000 0101 0001 0010 0010 0111 0011 1111 0011 0000 1110 1011 1100 0001 0010 0010 0101 1010 1110 1001 1100 1000 1110 0000 0011 1010 1000 0111 1011 0101 1110 1110 0011 1100 0100 1011 xxxx xxxx xxxx xxxx xxxx xxxx x001 0010 1011 0100 1000 1001 0010 0000 0011 1111 1001 0100 0111 0010 1100 0010 1001 1101 1100 1100 0111 0110 0000 1100 0111 0010 0110 0110 1100 0110 1101 1110 1001 1000 0110 1110 0101 1011 0100 0000 0001 1100 1100 1100 0110 1000 1101 1100 0001 0010 0110 0001 0011 1110 0001 0001 0110 0000 1110 0010 1xxx] to generate each CE symbol and vi) a '0' represents the BPSK point {+1, 0}, a '1' represents the BPSK point {−1, 0}, and an 'x' represents BPSK point {0, 0}.

* * * * *